(12) United States Patent
Renkis

(10) Patent No.: US 8,750,509 B2
(45) Date of Patent: *Jun. 10, 2014

(54) WIRELESS SURVEILLANCE SYSTEM RELEASABLY MOUNTABLE TO TRACK LIGHTING

(75) Inventor: Martin Renkis, Nashville, TN (US)

(73) Assignee: Smartvue Corporation, Nashville, TN (US)

( * ) Notice: Subject to any disclaimer, the term of this patent is extended or adjusted under 35 U.S.C. 154(b) by 1478 days.

This patent is subject to a terminal disclaimer.

(21) Appl. No.: 11/480,079

(22) Filed: Jun. 30, 2006

(65) Prior Publication Data

US 2006/0251259 A1    Nov. 9, 2006

Related U.S. Application Data

(63) Continuation-in-part of application No. 10/948,501, filed on Sep. 23, 2004, and a continuation-in-part of application No. 10/949,487, filed on Sep. 24, 2004, now Pat. No. 7,508,418, and a continuation-in-part of application No. 10/949,609, filed on Sep. 24, 2004, which is a continuation-in-part of application No. 10/950,033, filed on Sep. 24, 2004, application No. 11/480,079, which is a continuation-in-part of application No. 10/949,489, filed on Sep. 24, 2004, and a continuation-in-part of application No. 10/949,776, filed on Sep. 25, 2004, and a continuation-in-part of application No. 10/955,552, filed on Sep. 30, 2004, now abandoned, and a continuation-in-part of application No. 10/955,825, filed on Sep. 30, 2004, and a continuation-in-part of application No. 10/955,711, filed on Sep. 30, 2004, and a continuation-in-part of application No. 10/955,444, filed on Sep. 30, 2004, and a continuation-in-part of application No. 10/955,824, filed on Sep. 30, 2004, and a continuation-in-part of application No. 10/977,762, filed on Oct. 29, 2004.

(51) Int. Cl.
*H04L 9/00* (2006.01)
*H04N 7/18* (2006.01)
*H04K 1/00* (2006.01)

(52) U.S. Cl.
USPC ........... 380/270; 348/151; 348/152; 348/153; 348/154; 348/155; 348/156; 348/159; 348/207.1; 348/211.99; 348/211.2; 348/211.4; 348/211.11; 725/105; 340/539.22; 340/539.25; 340/541; 340/545.1; 340/545.3; 340/565; 340/573.1

(58) Field of Classification Search
USPC .......................................... 380/270
See application file for complete search history.

(56) References Cited

U.S. PATENT DOCUMENTS 4,148,019 A * 4/1979 Durkee .................. 340/531
4,699,484 A   10/1987 Howell et al.
(Continued)

OTHER PUBLICATIONS

Vicon Industries Inc., 'V905-CUBE HD Mini-Cube Network Camera [installation guide]', Copyright © 2013, Vicon Industries Inc., entire document, http://www.vicon-security.com/Collateral/Documents/English-US/Products/landO/V905-CUBE_Users_Manual.pdf.*

(Continued)

*Primary Examiner* — Kambiz Zand
*Assistant Examiner* — Ronald Baum
(74) *Attorney, Agent, or Firm* — Triangle Patents, PLLC

(57) ABSTRACT

A wireless surveillance system and methods of operating same, providing at least one data input capture device (ICDs), including cameras which have the ability to capture video, audio, and/or data from sensors such as temperature and humidity data, while being newly or retrofittably releasably mountable to a track lighting system.

8 Claims, 12 Drawing Sheets

(56) References Cited

U.S. PATENT DOCUMENTS

| | | | |
|---|---|---|---|
| 4,771,305 A | 9/1988 | Potoraka | |
| 5,086,385 A * | 2/1992 | Launey et al. | 700/83 |
| 5,257,007 A * | 10/1993 | Steil et al. | 340/539.3 |
| 5,485,964 A | 1/1996 | Booth et al. | |
| 5,584,576 A * | 12/1996 | Wei Hong | 362/396 |
| 5,653,412 A * | 8/1997 | Martorano et al. | 248/222.11 |
| 5,673,022 A * | 9/1997 | Patel | 340/565 |
| 5,697,099 A | 12/1997 | Siska et al. | |
| 5,982,297 A * | 11/1999 | Welle | 340/870.16 |
| 6,122,678 A * | 9/2000 | Eckel et al. | 710/15 |
| 6,249,223 B1 * | 6/2001 | Christensen | 340/540 |
| 6,526,225 B1 | 2/2003 | Windrem et al. | |
| 6,545,228 B2 | 4/2003 | Hashimoto | |
| 6,548,967 B1 * | 4/2003 | Dowling et al. | 315/318 |
| 6,591,474 B2 * | 7/2003 | Soloway et al. | 29/432 |
| 6,697,103 B1 * | 2/2004 | Fernandez et al. | 348/143 |
| 6,697,104 B1 | 2/2004 | Yakobi et al. | |
| 6,703,939 B2 * | 3/2004 | Lehrman et al. | 340/669 |
| 6,763,231 B2 | 7/2004 | Takatori et al. | |
| 6,830,387 B2 | 12/2004 | Rife | |
| 6,970,183 B1 | 11/2005 | Monroe | |
| 7,019,644 B2 * | 3/2006 | Barrie | 340/539.13 |
| 7,020,701 B1 | 3/2006 | Gelvin et al. | |
| 7,148,803 B2 | 12/2006 | Bandy et al. | |
| 7,239,236 B1 * | 7/2007 | Britton | 340/514 |
| 7,403,220 B2 | 7/2008 | MacIntosh et al. | |
| 7,886,010 B1 | 2/2011 | Shankar | |
| 7,899,887 B2 | 3/2011 | Conn | |
| 7,920,528 B2 | 4/2011 | Karaoguz | |
| 2001/0040805 A1 * | 11/2001 | Lansing et al. | 362/276 |
| 2001/0042114 A1 | 11/2001 | Agraharam et al. | |
| 2001/0056479 A1 | 12/2001 | Miyayama et al. | |
| 2002/0024812 A1 * | 2/2002 | Agro | 362/287 |
| 2003/0023614 A1 | 1/2003 | Newstrom | |
| 2003/0034387 A1 * | 2/2003 | Knowles et al. | 235/375 |
| 2003/0112335 A1 | 6/2003 | Strandwitz | |
| 2003/0137426 A1 | 7/2003 | Anthony et al. | |
| 2003/0189638 A1 | 10/2003 | Fry | |
| 2003/0210340 A1 | 11/2003 | Frederick | |
| 2004/0002792 A1 * | 1/2004 | Hoffknecht | 700/295 |
| 2004/0021778 A1 * | 2/2004 | Oldani et al. | 348/211.99 |
| 2004/0075547 A1 | 4/2004 | Vojtech et al. | |
| 2004/0105006 A1 | 6/2004 | Lazo et al. | |
| 2004/0113778 A1 * | 6/2004 | Script et al. | 340/545.1 |
| 2004/0122633 A1 | 6/2004 | Bang et al. | |
| 2004/0246128 A1 | 12/2004 | Menard | |
| 2005/0012829 A1 | 1/2005 | Tashiro et al. | |
| 2005/0210532 A1 * | 9/2005 | Winick | 726/22 |
| 2006/0019696 A1 * | 1/2006 | Brunel et al. | 455/550.1 |
| 2006/0176834 A1 | 8/2006 | Dickerson et al. | |
| 2007/0075857 A1 | 4/2007 | Chang | |
| 2011/0169634 A1 | 7/2011 | Raj et al. | |

OTHER PUBLICATIONS

Fleck, B, 802.11 Security, O'Reilly Publishing, Dec. 2002, Section 1.5 and 1.5.1.
How a Cell Phone Works, http://web.archive.org/web/19981206094029/http://howstuffworks.com/cell-phone.htm, 1998.

* cited by examiner

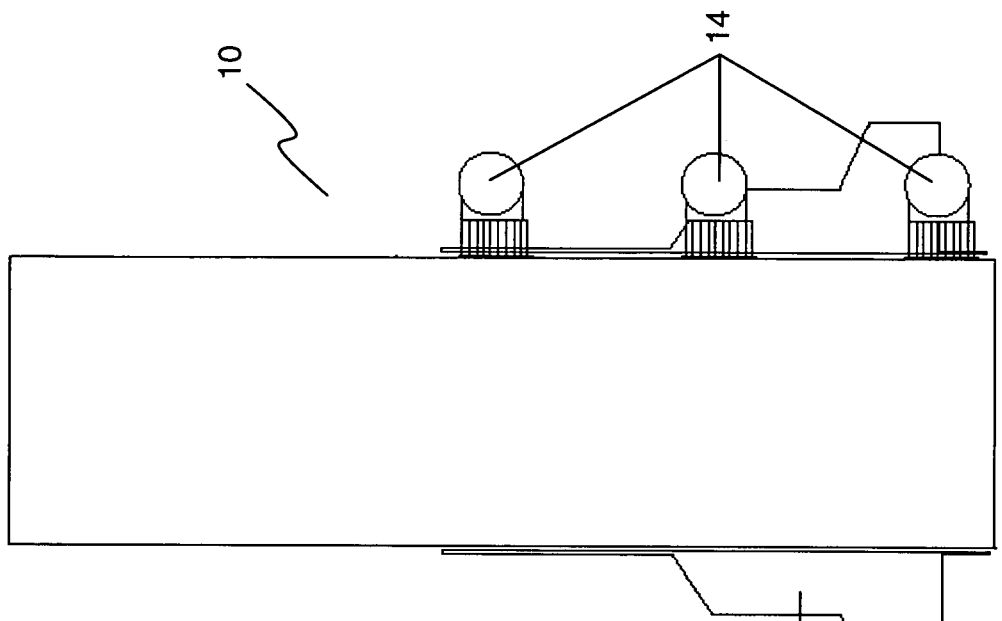
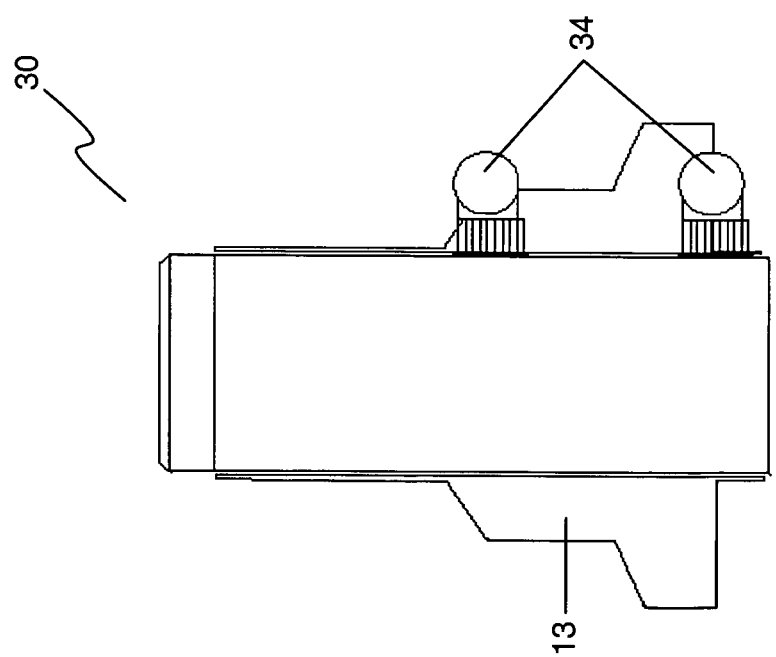
FIGURE 9

WIRELESS SURVEILLANCE SYSTEM RELEASABLY MOUNTABLE TO TRACK LIGHTING

CROSS-REFERENCE TO RELATED APPLICATIONS

This non-provisional utility patent application is related to one or more prior filed co-pending non-provisional applications as a continuation-in-part:
U.S. application Ser. No. 10/948,501, entitled "Wireless Video Surveillance System and Method, with Two-Way Locking of Input Capture Devices," filed on Sep. 23, 2004;
U.S. application Ser. No. 10/949,487 entitled "Wireless Video Surveillance System & Method with DVR-Based Querying," filed on Sep. 24, 2004;
U.S. application Ser. No. 10/949,609 entitled "Wireless Video Surveillance System and Method with Emergency Video Access," filed on. Sep. 24, 2004;
U.S. application Ser. No. 10/950,033 entitled "Wireless Video Surveillance System and Method with Remote Viewing," filed on. Sep. 24, 2004;
U.S. application Ser. No. 10/949,489 entitled "Wireless Video Surveillance System and Method with External Removable Recording," filed on. Sep. 24, 2004;
U.S. application Ser. No. 10/949,776 entitled "Wireless Video Surveillance System and Method with Dual Encoding," filed on. Sep. 25, 2004;
U.S. application Ser. No. 10/955,552 entitled "Wireless Video Surveillance System & Method with Digital Input Recorder Interface and Setup" filed on Sep. 30, 2004;
U.S. application Ser. No. 10/955,825 entitled "Wireless Video Surveillance System & Method with Rapid Installation," filed on Sep. 30, 2004;
U.S. application Ser. No. 10/955,711 entitled "Wireless Video Surveillance System & Method with Input Capture and Data Transmission Prioritization and Adjustment," filed on Sep. 30, 2004;
U.S. application Ser. No. 10/955,444 entitled "Wireless Video Surveillance System and Method with Single Click-select Actions," filed on Sep. 30, 2004;
U.S. application Ser. No. 10/955,824 entitled "Wireless Video Surveillance System and Method with Security Key," filed on Sep. 30, 2004; and
U.S. application Ser. No. 10/977,762 entitled "Wireless Video Surveillance System and Method for Mesh Networking" filed on Oct. 29, 2004.

FIELD OF THE INVENTION

The present invention relates generally to surveillance and sensor technology and equipment and, more particularly, to a wireless video surveillance system releasably mountable and configured to function within a track lighting system.

BACKGROUND OF THE INVENTION

While video surveillance systems have existed in the prior art, typically they are wired devices that are difficult, time-consuming, and costly to install and operate. Also, generally, the video surveillance systems are configured in standalone arrangements requiring separate power supply, an individual base or mounting with separate hardware, and limited range of data input capture due to location limitations.

Thus, there is a need to provide a surveillance system that is fully functional as an independent device while being releasably mountable and configurable with lighting fixtures, including existing track lighting, to facilitate and provide more flexible ceiling-based installation.

SUMMARY OF THE INVENTION

The present invention is directed to a wireless surveillance system and methods of operating same, providing at least one data input capture device (ICDs), including cameras which have the ability to capture video, audio, and/or data from sensors such as temperature and humidity data, while being newly or retrofittably releasably mountable to a track lighting system. Data input from the sensors preferably includes an initial sensing, reading or input, and further includes changes in the target environment relative to the initial readings or predetermined settings. Also, data input from the sensors is selected from visual images, sound, odor, temperature, the presence of chemicals or radiation, the presence or absence of movement, and combinations thereof.

Single or multiple ICDs are provided independently or configurable for wireless communication through a digital input recorder (DIR) positioned in a location remote from the ICD. The ICD transmits the data wirelessly (using network protocols such as 802.11, cell phone protocols such as CDMA or GSM, or any other wireless protocol such as Zigbee, Bluetooth, or other) to a DVM and the DVM can store the data, report on the data and take further actions on that data, either alone or in conjunction with a remote server computer (RSC).

One aspect of the present invention is to provide at least one ICD or camera releasably mountable to a track lighting system including wireless transfer capability of the captured data. Optionally, the system further includes an RSC that is network- or Internet-remotely accessed by at least one authorized user of the system as permitted by relevant control settings. Preferably, such controllable remote access includes user viewing of captured inputs of the target environment, including live and/or historical/recorded data, storing, editing, retrieving or otherwise reviewing said inputs, and controlling the system settings and activities, and combinations thereof.

These and other aspects of the present invention will become apparent to those skilled in the art after a reading of the following description of the preferred embodiment when considered with the drawings.

BRIEF DESCRIPTION OF THE DRAWINGS

FIG. 9 is a top view of the embodiment shown in FIG. 5.

DETAILED DESCRIPTION OF THE PREFERRED EMBODIMENTS

The present invention provides a wireless surveillance system and methods of operating same, providing at least one input capture device (ICD) that is newly or retrofittably releasably mountable to a track of a track lighting system. Single or multiple ICDs are provided independently attachable and configurable for wireless communication through a digital input recorder (DIR) positioned in a location remote from the ICD. The ICD transmits the data wirelessly (using network protocols such as 802.11, cell phone protocols such as CDMA or GSM, or any other wireless protocol such as Zigbee, Bluetooth, or other) to a DVM and the DVM can store the data, report on the data and take further actions on that data, either alone or in conjunction with a remote server computer (RSC). Thus the present invention provides at least one ICD or camera releasably mountable to a track lighting system including wireless transfer capability of the captured data while being mounted to the track lighting system. Optionally, the system further includes a RSC that is network- or Internet-remotely accessed by at least one authorized user of the system as permitted by relevant control settings. Preferably, such controllable remote access includes user viewing of captured inputs of the target environment, including live and/or historical/recorded data, storing, editing, retrieving or otherwise reviewing said inputs, and controlling the system settings and activities, and combinations thereof.

Figure 1:
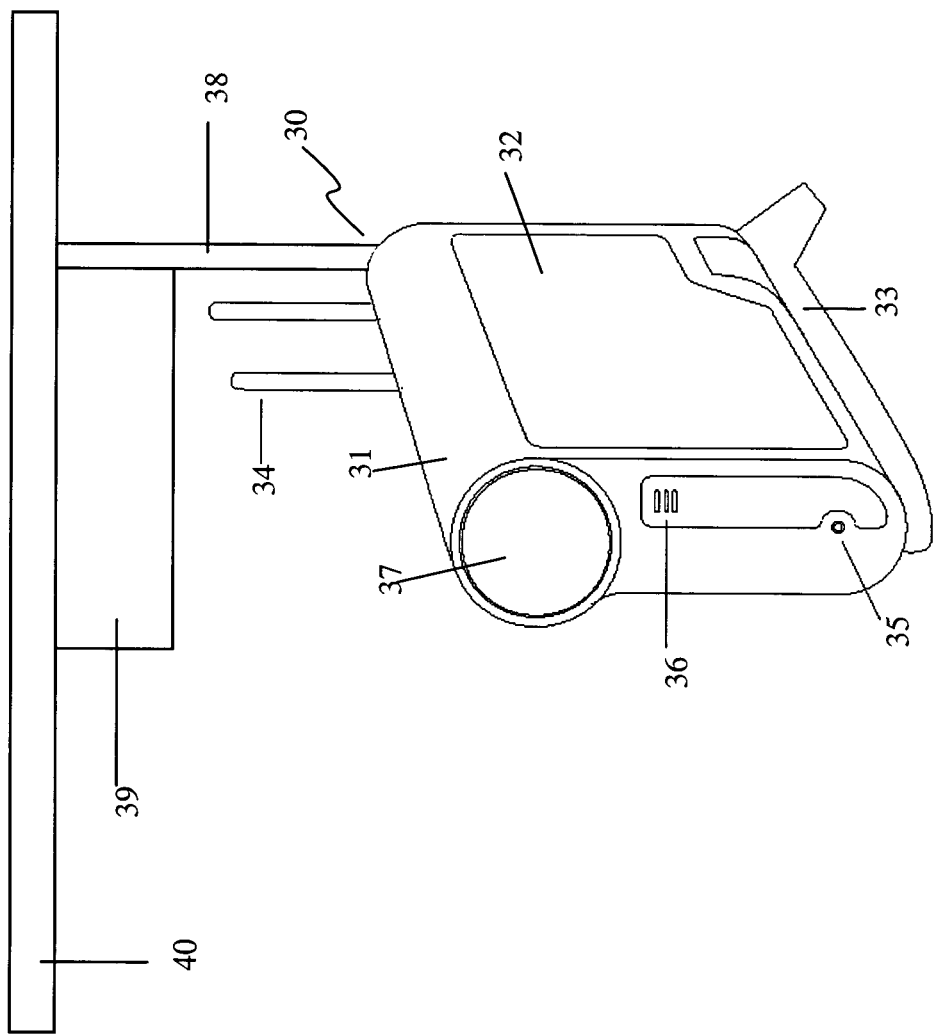
FIG. 1 is a perspective view of one embodiment constructed and configured according to the present invention.

In a preferred embodiment as illustrated in FIGS. 1-4, there is at least one digital camera or an input capture device (ICD) having data input sensors, a processor and memory, and other functional components for its basic operation as set forth in the following description of FIGS. 5-12. Different from the base illustrated in FIGS. 5-12, however, FIG. 1 illustrates the ICD of the present invention includes a housing having a camera mount 38 and a power supply 39 that are constructed and configured to provide for full ICD functionality and operation when releasbly connected and mounted to a track 40 of a track lighting system. ICD 30 has a plastic case 31 with a metal plate 32 affixed thereto and a removable tilt adjustable base 33 removably attached to the bottom of the ICD. Antennas 34, near the top of the ICD housing provide wireless communication for the present invention with other devices such as the DIR or RSC via a wireless communication network. A power/motion detection LED 35 is positioned near the bottom of the front of the ICD and can illuminate either red or green. Another input such as a microphone 36 is also illustrated being positioned on the front of the ICD housing to detect sound. The camera lens 37 is positioned near the top front of the ICD. Other input capture device functions and operations for various inputs are preferably optimally positioned in or on the housing to provide for reasonable input intensity from the target environment when the ICD is positioned and mounted from a track of a track lighting system.

In another preferred embodiment, the system further includes an RSC, which is network- or Internet-remotely accessed by at least one authorized user of the system, when control settings permit. Such controllable remote access includes user viewing of captured inputs of the target environment, including live and/or historical/recorded data, storing, editing, retrieving or otherwise reviewing said inputs, and controlling the system settings and activities, and combinations thereof.

Figure 2:
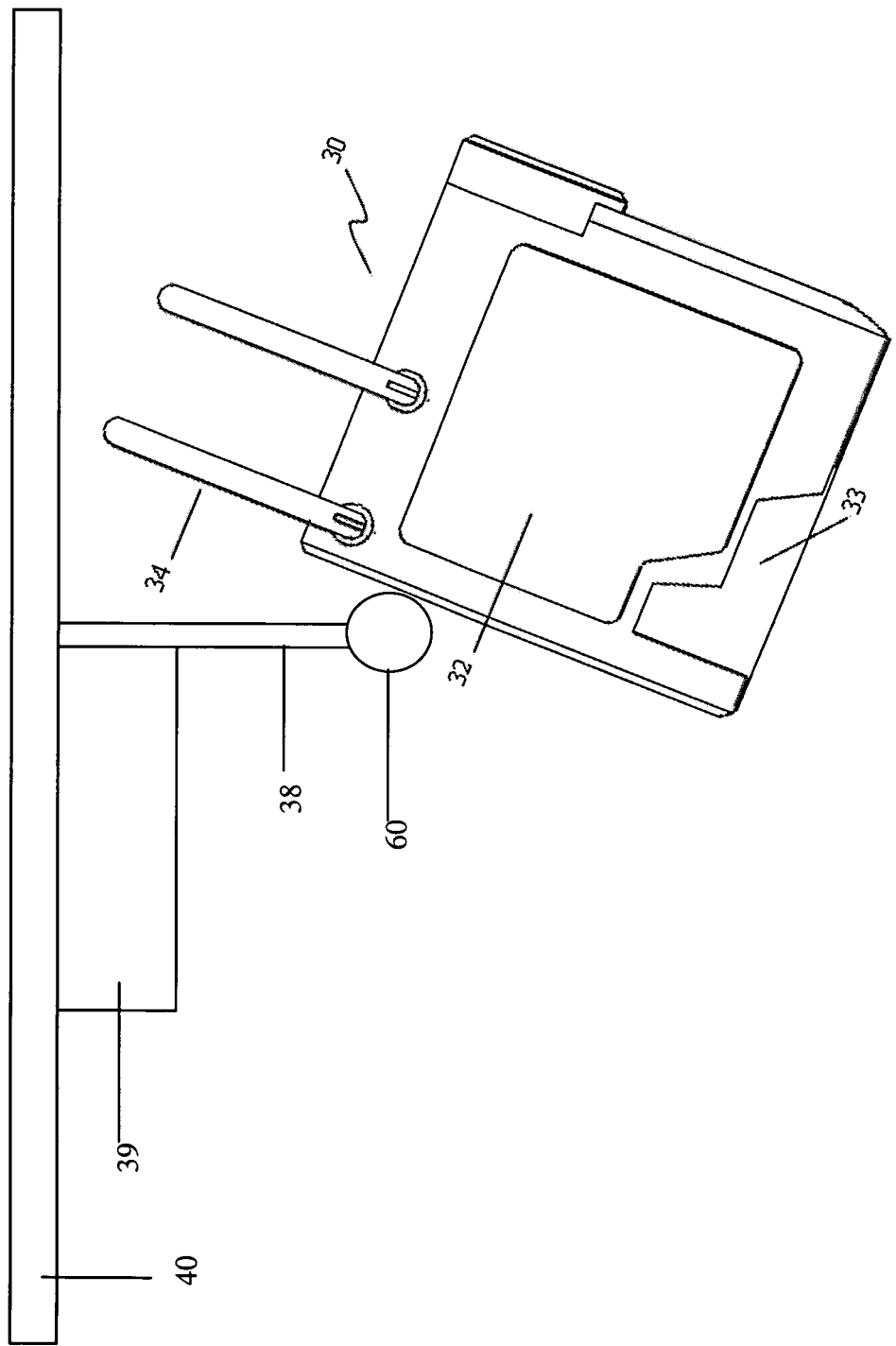
FIG. 2 is a side view of the embodiment shown in FIG. 1.

FIG. 2 illustrates a side view of the ICD 30 having a housing 32 mounted with an ICD mount 38 and power supply 39 including converter where needed, to a track 40 of a track lighting system, further including an adjustable mount 60. The adjustable mount includes functions or directional movement such as pivot and or rotation, which may be provided by a pivot or swiveling hinge or rotatable connector. Preferably, the adjustable mount provides automated or manual adjustment or movement from a first position to different positions relative to a first position when mounted to the track to provide for quick and easy mounting of the ICD and control of the initial direction of the ICD sensors into a target environment. Where the track of the track lighting system is mounted to a ceiling, the adjustable mount preferably provides a universal joint that provides for up to 180 degree rotation and/or pivot to provide input capture over the space below and surrounding the track lighting system, i.e., complete coverage of a room within the full range of the ICD sensors.

Figure 3:
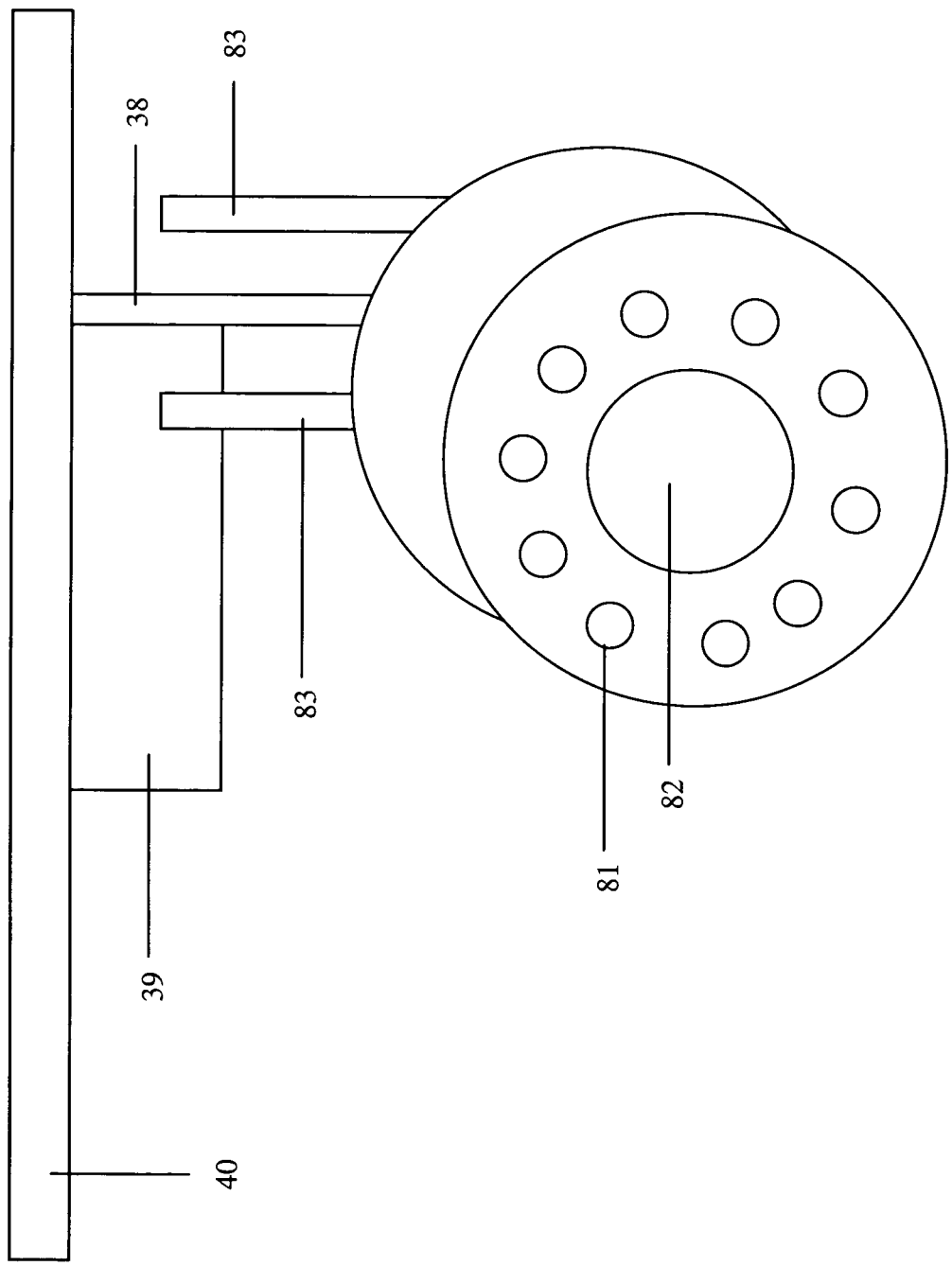
FIG. 3 is a perspective view of another embodiment constructed and configured according to the present invention.

FIG. 3 illustrates an ICD having a mount 38 and power supply 39 that are releasbly connected or mounted to the track 40 of a track lighting system. In particular, this illustration of an ICD according to the present invention further includes lighting 81 integrated with the ICD. By way of example, the lighting or illumination source is provided by light emitting diodes (LEDs), preferably with a bright visible light. Alternatively, traditional lighting source may be used to provide illumination along with or juxtapositioned input means or sensors for the data input capture by the ICD, such as images through a camera lens 82. In this embodiment, two antennae 83 are provided at the rear or back side of the housing of the ICD.

Figure 4:
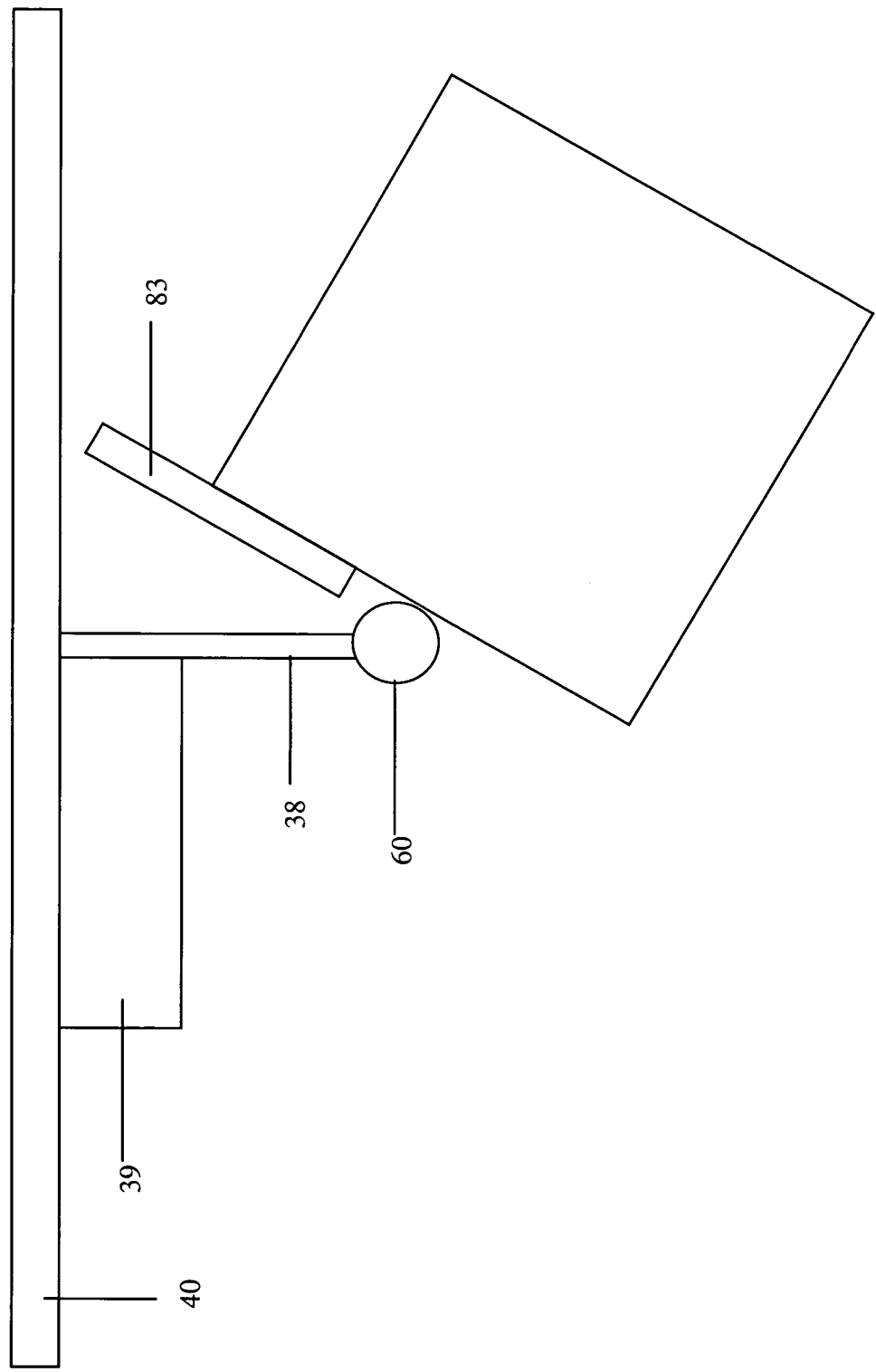
FIG. 4 is a side view of the embodiment of FIG. 3.

FIG. 4 illustrates a side view of a pivoted, mounted ICD of the embodiment of FIG. 3 for further illustrating the adjustable mount device 60 positioned on and connected to the back side of the housing of the ICD.

In any configuration, the data input from the sensors preferably includes an initial sensing, reading or input, and further includes changes in the target environment relative to the initial readings or predetermined settings. Also, data input from the sensors is selected from visual images, sound, odor, temperature, the presence of chemicals or radiation, the presence or absence of movement, and combinations thereof.

Figure 5:
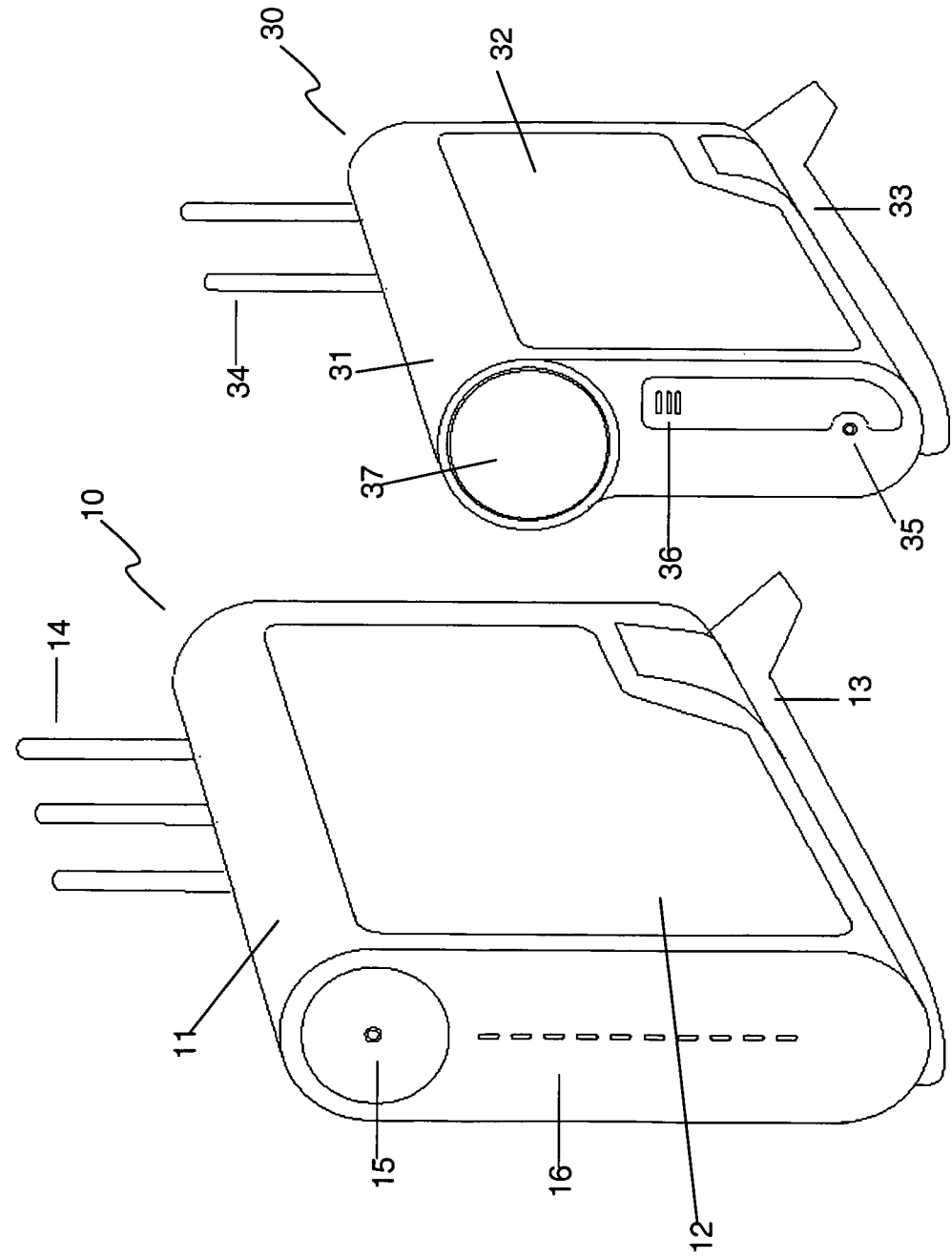
FIG. 5 is a perspective view of one embodiment showing more detail of standard components of a system constructed according to the present invention, showing an input capture device and a digital input recorder juxtapositioned each other, not illustrating the track lighting mounting components.

FIG. 5 shows a perspective view of one embodiment constructed according to the present invention, showing an input capture device ("ICD"), generally referred to as 30, and a digital input recorder ("DIR"), generally referred to as 10, juxtapositioned. The DIR 10 has a plastic case 11 with a metal plate 12 affixed thereto and a removable tilt adjustable base 13 removably attached to the bottom of the DIR. Antennas 14, near the top of the DIR provide wireless communication for the present invention. A green power led and button 15 is near the top of the DIR. The button 15 can turn on the motion detection and/or record all functions of the present invention. The status indicator LEDS 26 are placed on the front of the DIR and can illuminate either red or green.

Similarly, the ICD 30 has a plastic case 31 with a metal plate 32 affixed thereto and a removable tilt adjustable base 33 removably attached to the bottom of the ICD. Antennas 34, also shown in FIGS. 1 and 2, near the top of the ICD housing provide wireless communication for the present invention with other devices such as the DIR or RSC via a wireless communication network. A power/motion detection LED 35 is positioned near the bottom of the front of the ICD and can illuminate either red or green. Another input such as a microphone 36 is also illustrated being positioned on the front of the ICD housing to detect sound. The camera lens 37 is positioned near the top front of the ICD. Other input capture device functions and operations for various inputs are preferably optimally positioned in or on the housing to provide for reasonable input intensity from the target environment when the ICD is positioned and mounted from a track of a track lighting system, as illustrated in FIGS. 1-4.

Figure 6:
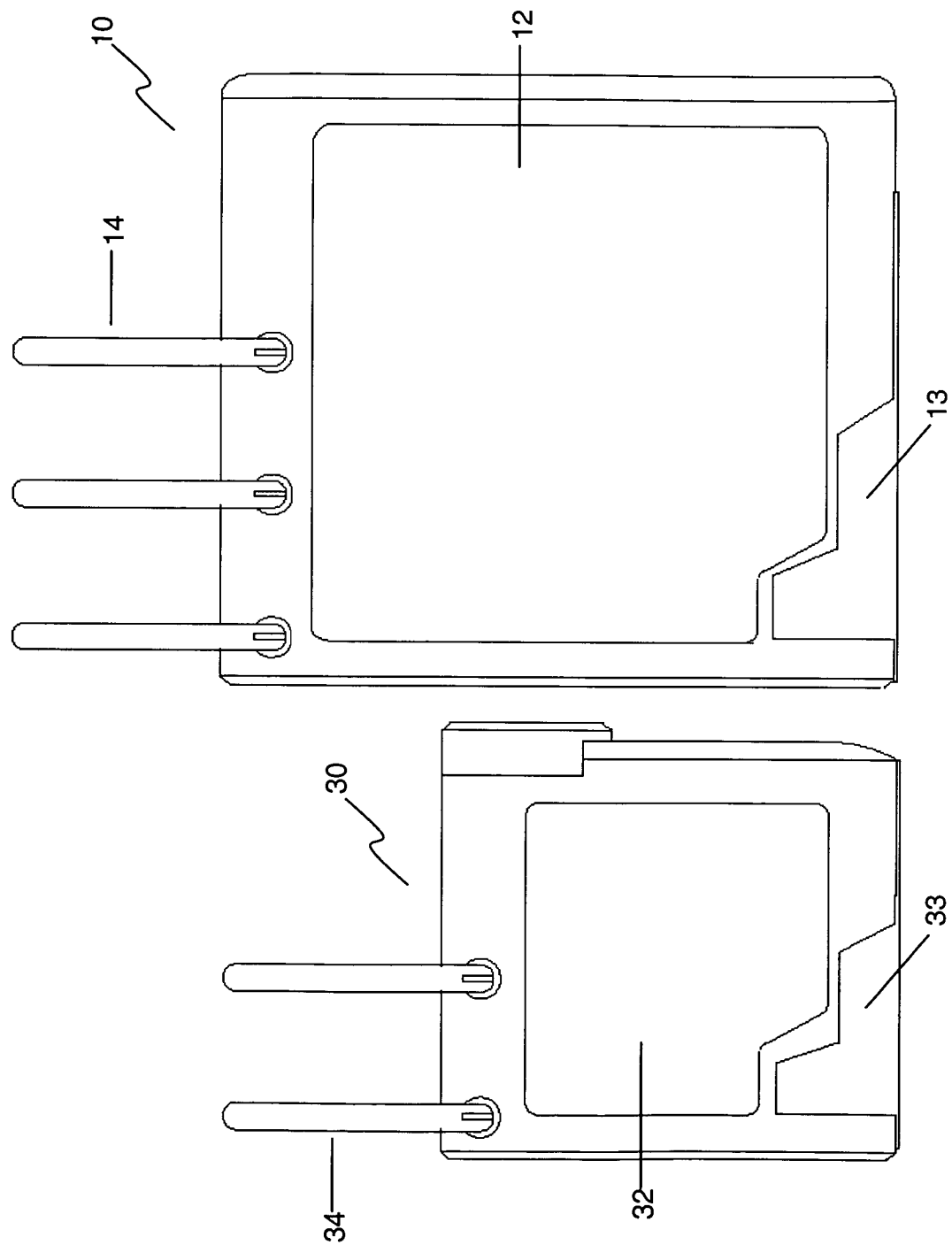
FIG. 6 is a side view of the embodiment shown in FIG. 5.

FIG. 6 shows a side view of the embodiment shown in FIG. 5, showing an ICD 30 and a DIR 10 juxtapositioned.

Figure 7:
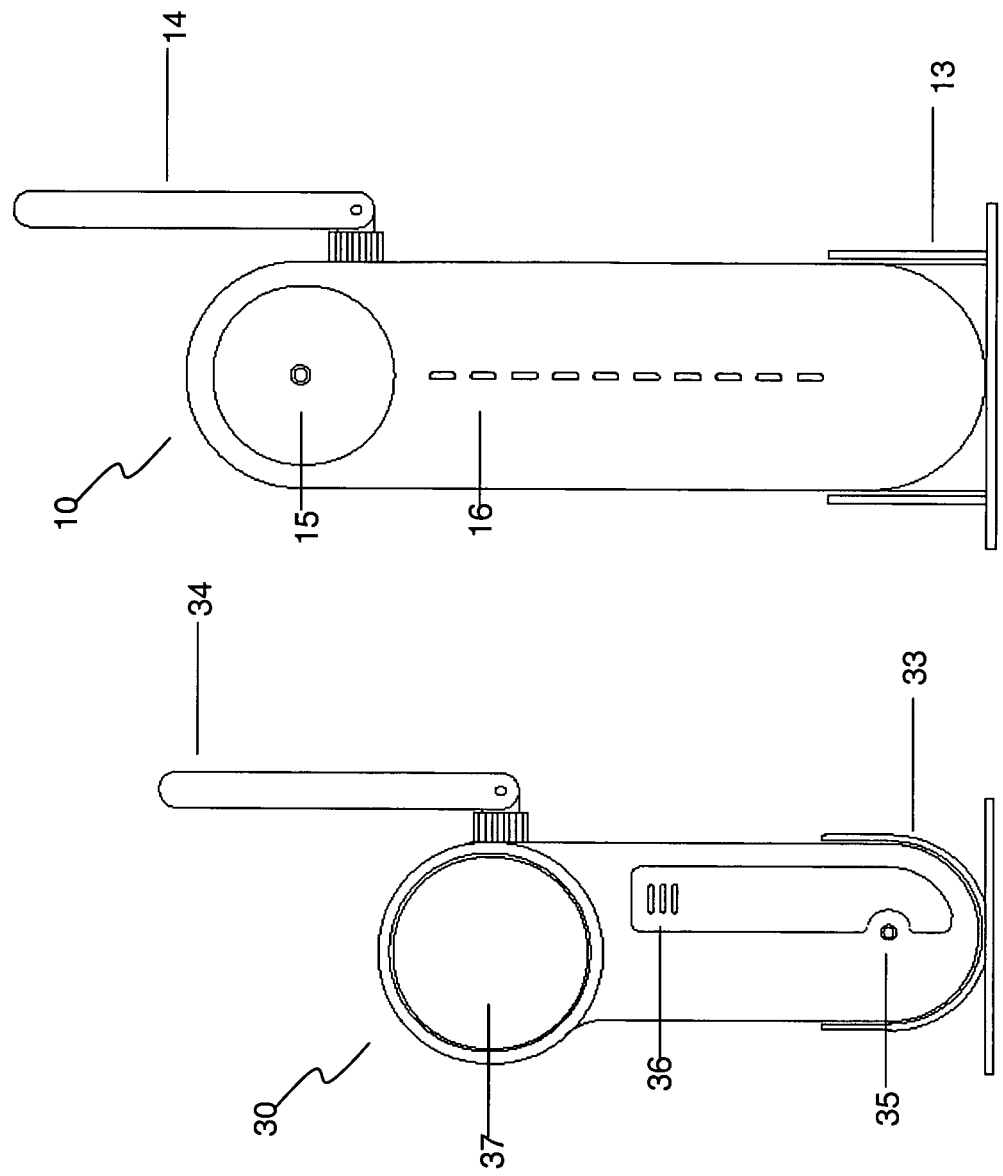
FIG. 7 is a front view of the embodiment shown in FIG. 5.

FIG. 7 shows a front view of the embodiment shown in FIG. 5, showing an ICD 30 and a DIR 10 juxtapositioned.

Figure 8:
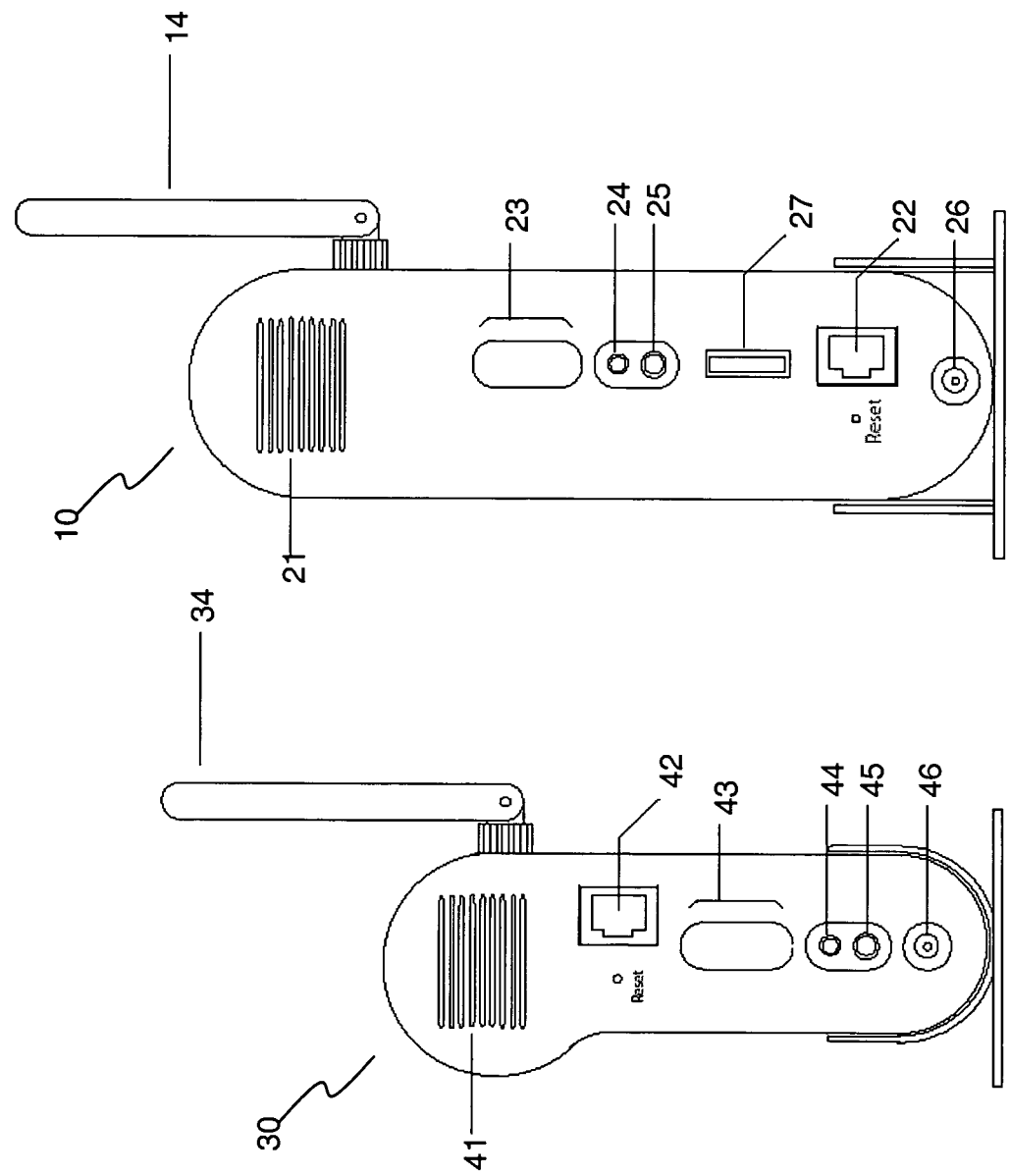
FIG. 8 is a back view of the embodiment shown in FIG. 5.

FIG. 8 shows a back view of the embodiment shown in FIG. 5, showing an ICD 30 and a DIR 10 juxtapositioned. The ICD 30 has air vents 41 to facilitate cooling of the device. FIG. 8 also illustrates the various ports that are available on the two devices. The ICD 30 has the following ports: RJ-45 42; Alarm I/O Out 43; Microphone In 44; RCA Video Out 45; and DC In 46.

Similarly, the DIR 10 has air vents 21 to facilitate cooling. Some of the ports may differ between the ICD and DIR. The DIR 10 has the following ports: RJ-45 22; Alarm I/O Out 23; Audio Out 24; RCA Video Out 25; DC In 26; and USB 27.

FIG. 9 shows a top view of the embodiment shown in FIG. 5, showing an ICD 30 and a DIR 10 juxtapositioned. This demonstrates the possible footprints of the devices.

Figure 10:
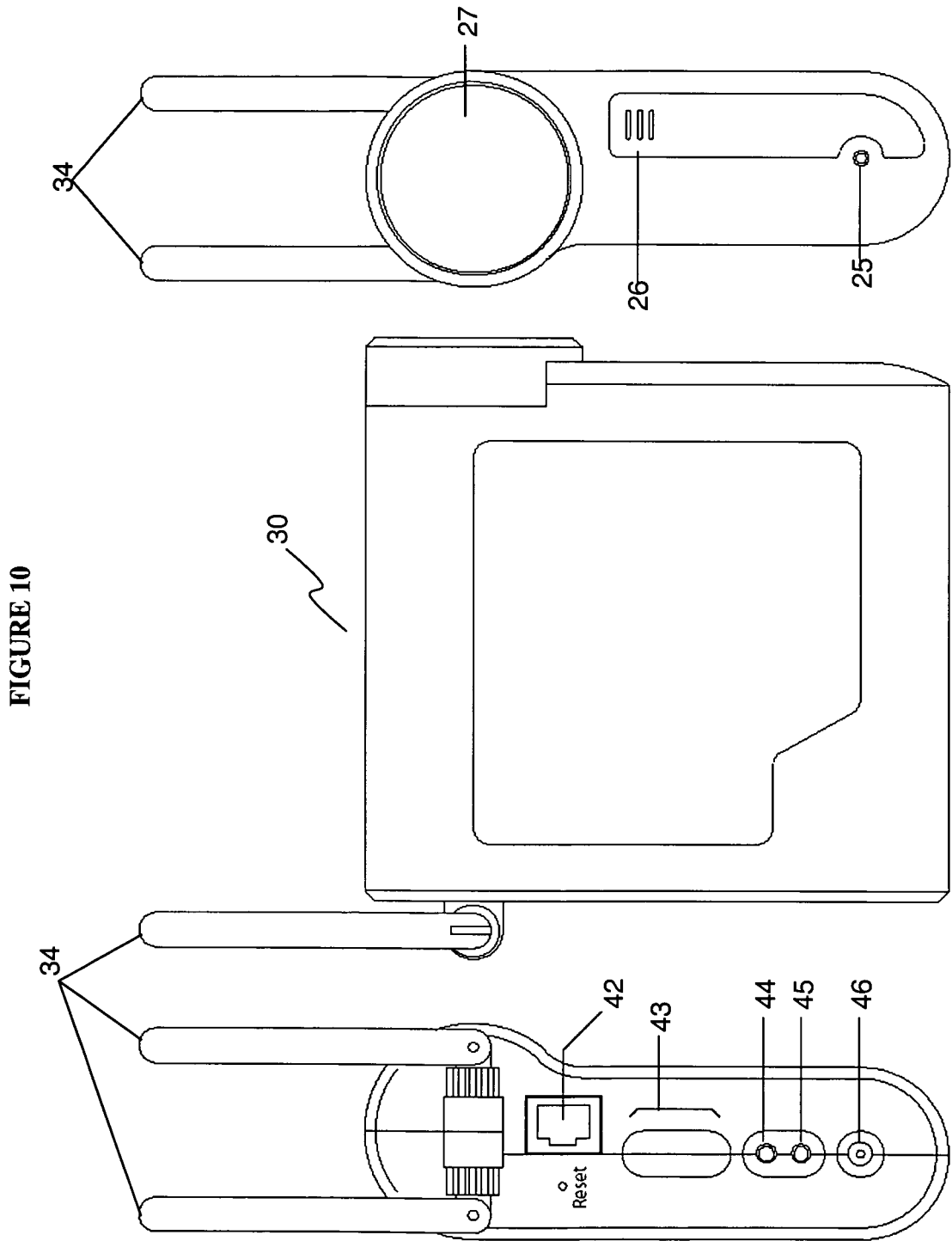
FIG. 10 shows a back, side, and front view of the input capture device component of FIG. 5.

FIG. 10 shows a back, side, and front view of an alternative embodiment of the ICD 30 component of FIG. 5. The ICD 30 is similar to that previously described except the air vents 41 have been removed and the antennas 34 have been positioned to the back of the ICD. Additionally, FIG. 10 illustrates the ICD with the removable tilt adjustable base 33 removed.

Figure 11:
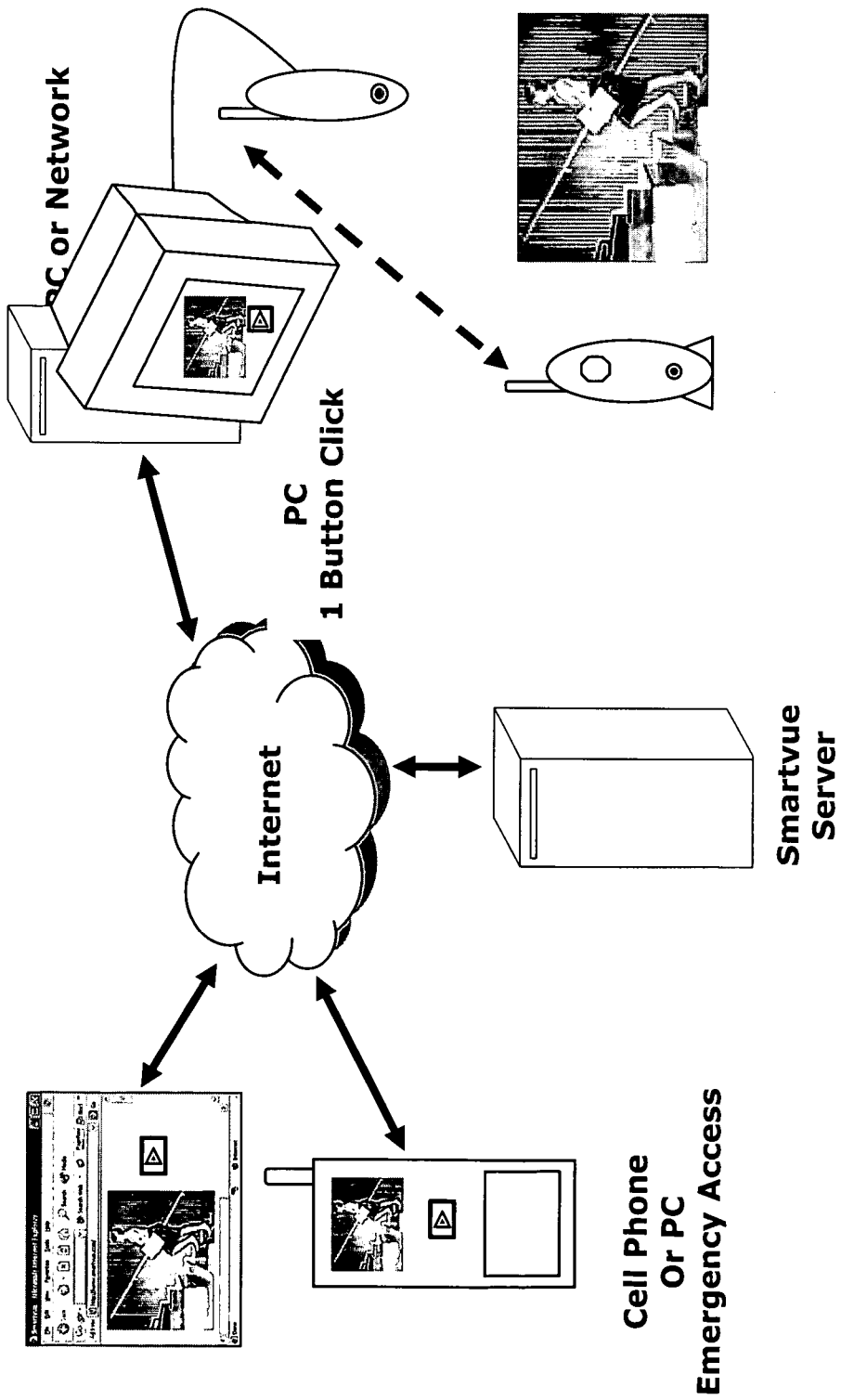
FIG. 11 is a schematic showing the interconnection of remote units of the system.

FIG. 11 shows a schematic showing the interconnection of remote units of the system.

Figure 12:
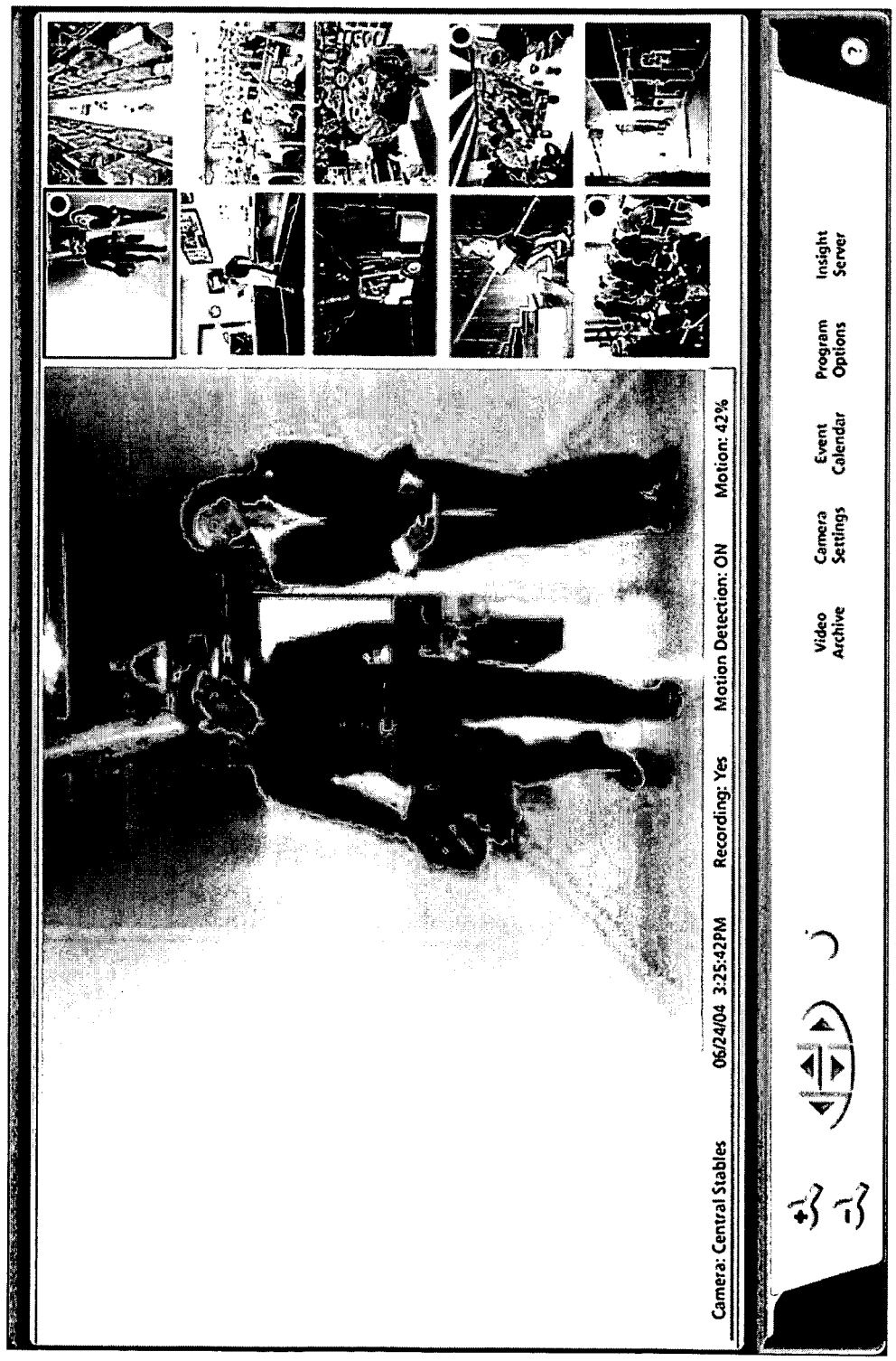
FIG. 12 is a user interface view of inputs to the system viewable by a user.

FIG. 12 shows a user interface view of inputs to the system viewable by a user.

The wireless surveillance system according to the present invention includes at least one wireless input capture device (ICD) for sensing, capturing and transmitting surveillance inputs from a predetermined input capture location, and a digital input recorder device (DIR) for receiving the surveillance inputs from the at least one wireless ICD and storing those inputs, which are capable of being reviewed by a system user on a controller/server computer, wherein the server computer is optionally used for communication with the ICDs and DIRs. In one embodiment of the present invention, the at least one ICD and corresponding DIR device are used to form the system without requiring a separate server computer. The DIR itself has full capabilities when arranged for communication wirelessly with ICDs for recording and controlling inputs to the system, as well as settings for each of the at least one ICD, including activation of each.

Input Capture Device(s) (ICDs)

On the front end of the system, the at least one wireless ICD further includes a power source, a power converter; soft power down component which provides for a gentle power down so that ICD settings are preserved and not lost. Preferably, while the ICD is wireless, it further includes an optional network connection at a back side of the ICD also, so it can be hardwired into a network.

The ICD also includes at least one sensor and at least one input component for detecting and recording inputs, a processor, a memory, a transmitter/receiver, and optionally, at least indicator light for indicating camera activities, all constructed and configured in electronic connection. By way of example and not limitation, the at least one input component may include a microphone, and/or a camera. In one preferred embodiment of the present invention, the at least one wireless ICD includes two antennas for providing a wireless signal for receiving and/or transmitting data with the DIR device or another ICD(s). The ICDs are operable for cross-communication with each other, including data exchange, wherein the data exchange includes information about the surveillance environment, settings, inputs, and combinations thereof. The at least one wireless ICD further includes a housing having a removable casing around the lens to make lens adjustments or settings; ICD adjustments and settings are preferably optional, and are not usually required in preferred embodiments of the present invention, as the DIR device automatically establishes and controls the ICD settings and activities for each of the at least one wireless ICDs associated with the particular DIR device.

For the preferred embodiments where the ICD includes a digital video camera (DVC) having a lens and corresponding camera components, the camera further includes a computer chip providing for capabilities of performing video compression within the ICD itself. The ICD as a wireless digital video camera is capable of capturing video within its range within the surveillance environment and compressing the captured video into a data stream, the capture occurring at predetermined dates and times, during activity detection, and/or on command from the wireless DIR associated therewith. In the case of video, the images are adjustable to capture at different sizes, different frame rates, and/or to include the display of the name of the device (determined by the user and/or the system), the date, the time, and combinations thereof. The ICD including a DVC is capable of capturing images that are combinable and/or integratable with the video data stream and/or compressible into an individual image data stream, all at predetermined dates and times, when activity such as motion or audio are detected, on command from the wireless DVR, and combinations thereof. As with video capture, image capture is adjustable to capture at different sizes, different frame rates, and/or to include the display of the name of the device (determined by the user and/or the system), the date, the time, and combinations thereof. A data stream of images is transmittable wirelessly to the wireless DVR.

Similarly, where the at least one ICD has audio capabilities, the captured audio, which is combinable and/or integratable with other inputs captured by the ICD sensors, is compressible into an individual audio data stream, which is transmittable wirelessly to the DIR. The activity of audio ICD is activatable at predetermined dates and times, during activity detection, and/or on command from the wireless DIR associated therewith. The audio ICD is further adjustable to capture audio at different or variable rates.

Preferably, since the ICD generates heat during operation, the ICD housing includes a cooling system having a vent and a low noise cooling fan. Since the video components of ICDs generate heat that must be dissipated for optimal performance of the system, preferred embodiments of the present invention include housing units with components that operate at lower temperatures, i.e., which generate less heat during operation, and include housing units formed of materials that dissipate heat well, and may include a combination of materials, such as metals and synthetic plastics or composites. While ICDs are preferably used for indoor applications, waterproofing and weather proofing housing units and other components for sealing the housing against water and weather are used for outdoor applications of the present invention. By way of example, sealed or gasketed casing, weatherproof venting and fan components to prevent water blowing into or being sucked into the case, are used for outdoor ICD units.

Other components optional to the housing unit but preferred for ease of use of the system include a removable filter collar on a front end of the camera lens, which facilitates user access for changing the filter and/or to provide a different filter, such as a polarization filter or a specialty filter, for example, to reduce light input or camera aperture.

The ICDs of the present invention are capable of detecting motion, capturing video, detecting and/or capturing audio, providing at least one data stream capability, including video, compressed video, audio, and combinations thereof. The at least one ICD is capable of capturing video, which is compressible into a data stream, and transmittable wirelessly to the DIR device, with the ICD audio data or other input data, such as temperature, humidity, chemical presence, radiation, and other input data, depending upon the sensors and intake means of each ICD, being combinable and/or integratable with the video data stream. Thus, while the ICDs each include at least one sensor for detection and at least one capture input means, preferably each of the ICDs include at least two sensors and input means for image and/or video, and audio capture. In a preferred embodiment, at least two sensor types are used, audio and image or video sensors. The at least one indicator is included with the ICD to indicate that the power is "on", and to indicate that motion and/or audio being detected. The indicator is activatable when motion and/or audio is detected in a predetermined area and/or in a predetermined amount within the environment.

Each of the at least one ICDs is constructed for configuration that is capable of wireless communication (2-way) with the corresponding DIR device and/or any other ICD(s), which when configured provide a system for wireless electronic surveillance of an environment. In a preferred embodiment of the present invention, the ICDs are provided with multiple input multiple output (MIMO) wireless capability. Other wireless communication may be provided instead of MIMO.

Night vision for ICD video input capture may be provided using an infrared (IR) light source, so that the video recorded may be effective in low- to no-light conditions. Image or video input capture may be provided in a range of resolution, in black/white, in color, and sized based upon inputs from the DIR device and/or controller/server computer by an authorized user of the system, and are modifiable after setup of the system by modifying controls remotely, and/or by modifying hardware.

The ICD further includes at least one chip that makes the device an intelligent appliance, permitting functions to be performed by the ICD itself without requiring software installation or the DIR, including but not limited to sensor and input controls, such as camera digital zoom, pan left and right, tilt up and down; image or video brightness, contrast, saturation, resolution, size, motion and audio detection settings, recording settings, communication with other ICDs; and single chip video compression (single DSP). The ICD also includes a sensor with ability for high dynamic range for inputs. Preferred embodiments of a system according to the present invention includes video technology commercially provided by PIXIM, and set forth under U.S. Pat. Nos. 6,791,611; 6,788,237; 6,778,212; 6,765,619; 6,737,626; 6,726,103; 6,693,575; 6,680,748; 6,665,012; 6,552,746; 6,545,258; 6,542,189; 6,518,909; 6,507,083; 6,498,576; 6,498,336; 6,452,152; 6,380,880; and 6,310,571.

The ICD further includes a stand to support the device; the stand may be included with, integral with, or attached to the housing. The stand is constructed and configured to be mountable to a wall, suspend from ceiling, and provide a variety of stable positions for the ICD to capture as much data from a given environment as appropriate, given the space, conditions, and input capture type desired. Importantly, the stand serves as a stable base to tilt the ICD for camera direction up and down, and/or side to side. The stand is movable between positions but retains a fixed position by a predetermined friction to ensure so that the ICD stays in place wherever the positioning was last stopped. The base and stand of the ICD is constructed such that it does not require mounting to a surface to provide stability. The adjustability and mobility of the device are significant features of the present invention to ensure optimal surveillance and easy setup.

Furthermore, the stand is weight balanced for good center of gravity to support the adjustment on the stand for stability on the entire range of motion for the ICD on its stand; since motion of the ICD is adjustable and provides for dynamic range of motion when the ICD is in use, the stand construction enables remote modification of settings without requiring the user of the system to readjust or optimize the ICD positioning in person.

The ICD preferably is constructed and configured for a range of coverage, which can vary depending upon the conditions and limitations of a particular target environment. In a preferred embodiment of the system, the ICD has a range of coverage with a target range of at least up to 250 ft. The ICDs are capable of having a range of up to 300 meters, with an active wireless range from 1-1000 ft linear feet indoors. Advantageously, the ICD can be configured and activated quickly for quick start up of a surveillance system in the target environment. Additionally, the ICDs have the ability to communicate with one another to act as a data repeater and extend the usable wireless range to 3,000 meters and more.

Significantly, no adjustments to camera settings, such as focus and focal length, are required after camera installation; ICD settings are preadjusted and further controllable remotely by the DIR and/or RSC and/or other ICD(s). By contrast, in the prior art, adjustments are usually always required for surveillance cameras following installation. Preprogrammed settings may be provided, with automatic and remote adjustment capabilities. Where the ICD is a video camera, the settings may include focus, resolution, etc.

Each of the at least one ICD is constructed to optimally reduce heat from particular heat-generating components. In a preferred embodiment of the present invention, the ICD includes a plastic case with metal sides to reduce heat while the system is running. Also, a back plate of the ICD or camera is all metal to increase heat dissipation, and to optimize weight and heat management, which important where there is a lot of power involved, as with wireless video input devices. Also, significantly, the ICDs and/or DIR devices are constructed with a separate chamber for imaging components to reduce heat. It is known that heat is not good for imaging sensors or equipment; however, cooling fans can generate noise, which is preferably minimized with security systems and components therein. The camera is configured to communicate with an imaging board with a flexible electronics communication cable, which permits the camera to have a separate chamber for optimized heat reduction. This is a problem specific to wireless cameras that has not been successfully addressed in the prior art.

The ICD also includes at least one and preferably two antenna that are removable, including standard antennae, which may be substituted for a patch antenna and/or a long range antenna.

The inputs captured by ICDs are provided to the DIR for which output for RCA viewing is available, such as connecting a monitor with a user interface for remote viewing of video from video cameras. In this case the setup easier because the remote user can see what the camera views from the monitor, which is removably connectable to the system. The ICD and DIR also have an optional network connection at the back side, so the devices can be hardwired into the network, if appropriate; however, wireless connections are preferred.

Additionally, the ICDs have inputs, such as video and microphone, and at least one indicator light. In the case of a wireless video camera, the housing includes an easily removable casing around the lens to make lens adjustments or settings, which optional, and not usually required.

Additionally, the ICDs have the ability to communicate with one another to exchange data about the environment and all control settings and other settings of any other ICDs.

Digital Input Recorder Device (DIR device)

The wireless DIR device communicates directly with the at least one ICD, and, in embodiments where the controller/server is included in the system, the DIR device also communicates with the controller server to send data streams to the server and receive data or instruction from the controller/server to control its properties. In the case of a video camera for at least one ICD, the DIR may also be referred to as a digital video recorder device (DVR).

Surprisingly, compared with prior art surveillance systems, the DIR device functions as an appliance, which permits a rapid setup of the system. Significantly, since the DIR device operates as an appliance, there is no software installation involved in the basic system setup. The preferred embodiments of the present invention including at least one ICD and a corresponding DIR device permit for setup and recordation of inputs to the system from the observation or surveillance environment with one click activation by the user/installer, generally in less than ten minutes from start to finish. Such rapid setup, including installation and activation to recording of the system, is not possible with prior art systems, given their complex components, interactivity via transmission lines, and/or software installations, which typically require an expert or trained specialist to ensure proper setup, installation, activation, and testing of the system prior to ongoing operation. By sharp contrast, the preferred embodiments of the present invention provide for one click activation for receiving and recording inputs to the at least one wireless ICD, i.e., for activating the ICD capability to record designated dates and times, when a surveillance event, a motion event or an audio event is detected by at least one of the at least one ICDs in the system, immediately after the rapid setup is complete.

Furthermore, the system provides for rapid settings adjustment, including settings for sensitivity of ICD motion and audio detection; preferably, the settings adjustment is made by the user through the DIR device. The user simply sets a surveillance area for observation and data capture by each ICD of the at least one wireless ICD; for video capture, using an ICD with a digital camera, the camera may be set to focus on a predetermined location within the area, such as a window, a door, and the like. While the settings are practically a function of the ICD itself, the DIR device, which is also wireless, functions to control the settings of each of the corresponding ICDs associated with that DIR device. Other functions performed by the DIR device include, but are not limited to printing, saving or storing recorded inputs from the ICDs, transferring data to a removable storage device, such as a USB storage key device.

Also, a power supply and a soft power down function is provided, similar to the ICD soft power down, to preserve the settings of the DIR device in the event of power termination to the device.

The DIR is capable of running software for managing input from the at least one wireless ICD associated with or corresponding to a particular DIR device after installation. With the software, the DIR is capable of intaking and managing up to 10 data streams simultaneously; allowing the user to control the ICD unit, including allowing the user to zoom, pan, and tilt the camera, as well as managing microphone sensitivity. Sensitivity controls for other ICD input means, such as heat or temperature, chemical substance presence, radiation detection, and the like may be controlled remotely from the wireless DIR device as well. Other DIR device control functions for controlling the ICDs include but are not limited to controlling brightness, contrast, color saturation, where images and video are involved.

Other software-based functions capable of being performed by the DIR include sending text message, sending still image, sending email or other communication to a user on a remote communications device; usually, these functions are programmed to occur upon the occurrence of an event. DIR data recordation and storage overwrite may be based on settings that enable newer data to overwrite older data. Additionally, the DIR may be programmed to include overwrite protection to prevent overwriting of event video, audio, or other input data captured by the ICD and transmitted to the DIR device. Preferably, the DIR includes capabilities of data search and display, data archiving to external device, network, computer, server, and combinations thereof, data printing, data exporting, data deletion, data playback, and combinations thereof. Data playback includes play, fast forward, rewind or reverse, frame by frame step forward or backward, pause, and combinations thereof.

In a preferred embodiment of the present invention, the system includes a DIR device running software that is capable of automatically upgrading its own software, which eliminates user maintenance, upgrading, or other activity to optimize system performance.

The DIR's capabilities of adjusting settings and/or controls for the at least one ICDs includes any functions of the ICDs, including but not limited to zoom pan and tilt, color brightness, contrast, saturation, sharpness, frame rate, video and/or image size, audio rate, wireless control data, encryption and security data, set motion and/or audio detection area and/or levels, set recording, set triggers, record on command, and combinations thereof.

The DIR is preferably capable of connecting directly to a computer or a computer network, more specifically connecting to a personal computer via a USB or similar connection and to a network using a network cable or similar connector, with the DIR interface being accessible after such connection through a user interface or a web browser, respectively; and capable of sending data and/or alert or warning to a cell phone or computer via a signal or message such as by voice or email.

Also, the DIR is capable of performing a backup of the ICD inputs, including video, to a network, a personal computer (PC), computer readable medium (CRM) or other storage device. The DIR may be programmed to lock to predetermined ICDs having cameras, to maintain integrity of camera signal to DIR device.

In a preferred embodiment of the present invention, the user interface of the ICD inputs on the DIR device include at least one visual cue on the video to tell whether video is being recorded, e.g., a red and/or green dot is shown on the image. Also, preferably, the DIR device has a front with indicator lights that match or correspond to these same visual cues. For quality checking purposes, similarities such as these provide ease of use for the system user to confirm system functionality upon inspection.

The DIR device is programmable for wireless communication with input capture device, including both transmitting data, settings, controlling instructions and receiving input captured from the ICD, like images, video, audio, temperature, humidity, chemical presence, radiation, and the like. Thus, the DIR device is capable of receiving wireless data from the wireless input capture device(s), indicating which of the ICDs is active, recording data and storing data, searching through recorded data, transmitting data and instructions to the ICD, adjusting ICD settings and/or controls, communicating with the controller/server computer to send and/or receive data, and other functions, depending upon the specifications of the system setup, the environment under surveillance, and whether or not remote access is used via the controller/server computer and Internet.

The DIR device's data recordation and storage capability permit inputs from a multiplicity of ICDs to be associated with each DIR device to be singularly received, recorded, stored, and researched by a remote user from the ICDs. The user can search historically recorded data by date, time, event type, or any other means of selecting a setting or event corresponding to the each or any of the ICDs and the environment under surveillance by the system. Each of the ICDs is capable of individualized settings control by a single DIR device; a multiplicity of DIR devices may be controlled and managed by the controller/server, either within a given surveillance environment or in different locations.

Other components of the DIR device include, but are not limited to having a base that may be optionally adjustable for optimized mounting on a surface; having a long range MIMO wireless component; having a one-chip video compression component for resizing video data, recompressing it, and streaming it; having a USB port connectable to a computer, or for storage key, or removable hard drive for data storage; having an ethernet port to connect to a network; having RCA video output like the ICDs; having 2 or 3 USB ports for data output as well as for a USB based security key, having at least one antenna, preferably three antennae, which may be removable and replaceable; having a power control button on the housing; having a recessed reset button in the housing, accessible on the backside of the housing; having a low noise fan; having a hard drive for recording inputs; and/or having at least one, preferably a multiplicity of indicators, preferably light emitting diodes (LEDs), that are viewable by a user on the outside of the housing of the DIR device.

By way of example, in a preferred embodiment of the present invention, the DIR device has ten LEDs on the front of the housing, each of which correspond to an individual ICD. Significantly, these indicators, in particular as LEDs, provide content dense visual information with a quick glance from the user. There are five modes that represent ICD status, illustrated for one embodiment in the following table, Table 1:

| LED INDICATOR | CORRESPONDING STATUS |
| --- | --- |
| Off | ICD off |
| Green | ICD connected to DIR device |
| Flashing Green | DIR recording inputs from the ICD |
| Flashing Red | ICD detecting at least one event |
| Red | Error warning |

The error warning may be due to a variety of conditions, such as, by way of example and not limitation, lost connection between the ICD and DIR device, data loss, throughput reduction, etc. In a preferred embodiment of the present invention, each LED that represents an ICD has a light color and flash as described hereinabove, but also shows a number to indicate which camera has the activity and its corresponding section of the target environment, e.g., camera #1 shows the front entrance doorway view.

The optional remote controller or server computer (RSC) runs software providing for remote access and control, and is separate from the wireless DIR. Users log in with a username and password from any Internet connected PC, web enabled cell phone, or other Internet enabled or network communicable device, to remotely access or review the wireless input or camera video and/or image(s). The user accesses the system through a user interface operating in connection with a web browser. The RSC communicates directly with the wireless DIR and enables users to remotely configure wireless DIR properties and the ICD properties, and, preferably to perform any of the functions that are directly performable for any DIR or ICD, such functions being set forth in the foregoing. The RSC may provide an electronic commerce function such as providing a user to pay for remote access service. The RSC provides an authorized user remote from the target surveillance environment the option of logging into the system, selecting any ICD for monitoring, e.g., select any camera input from any DIR, print, save, email image from the input, such as a video clip, and zoom, pan and tilt live video through the DIR, similar control and/or access activities, and combinations thereof.

The RSC functions as a remote monitoring station like a personal computer and is capable of providing a user interface that is accessible through a web browser; the RSC is thus any Internet connectable device, including computer, PDA, cell phone, watch, any network accessible device, and the like, which provides access for at least one remote user. The at least one remote user is preferably a predetermined, authorized user.

Users of the system are preferably authorized, whether access is direct or remote. Apart from direct access, authorization may also determine levels of access for each user. While all capabilities of the DIR and ICDs are controllable remotely, either by the DIR itself or by an Internet communicable device in communication with a server computer that communicates with the DIR(s), the number and type of devices may be limited based upon authorization level of a user.

The RSC provides for user remote access to live and/or recorded audio and/or video for any camera on any DVR; furthermore, control functions permit this user(s) to adjust and to make changes to any DVR or ICD settings remotely. Also, off-line archiving is operable via the user selecting to remotely record to the RSC.

DIR and ICD Communication Locking

In one embodiment of the present invention, a method for locking communication between at least one wireless input capture device ICD(s) and a corresponding digital input recorder (DIR) or other ICD(s), either one-way and/or two-way, is provided, including the steps of providing base system; at least one user accessing the DIR via user interface either directly or remotely; the DIR and/or ICD(s) searching for signal from the ICD(s) and establishing communication with them; and locking the ICDs to send wireless data exclusively to that DIR or ICD; and/or the DIR or ICD locking itself for exclusive communication with the locked ICDs, thereby providing a secure surveillance system for a target environment.

DIR Activation and ICD Searching

The ICD is activated when at least one user accesses the DIR software by either launching the software directly or launching the DIR device or by clicking on or click selecting an activation or start button from the user interface or directly on the device for triggering activity steps within the software and hardware system to activate communication including data exchange between predetermined DIRs and their corresponding selected ICDs. In a preferred embodiment of the present invention the at least one ICD includes a wireless digital camera and the corresponding DIR is a DVR; however, one of ordinary skill in the art will appreciate that the functionality applies to a range of ICDs and corresponding DIRs, with or without video capabilities in each case. When any of these events occur, the DIR initiates checking for signals from prior configured capture devices. If the DIR starts without any prior configured capture devices, then the DIR automatically begins searching for wireless signals from capture devices. If the DIR starts with prior configured capture devices and the user wants to add additional devices, the user clicks on a search button or click select option within the user interface, and the DIR begins searching for wireless signals from capture devices not already configured and communicating with the DIR.

Communication

In a preferred embodiment of the present invention, the DIR is operable to identify signal(s) from the at least one ICD corresponding thereto, and the DIR automatically establishes communication with the identified capture device and creates a named representation 220, such as an icon or image with a name that represents the active ICD. Also, the DVR is operable to create a named representation for each of the corresponding ICDs associated with that DVR that are identified but not in active communication with the DVR at that time. The non-communication status of these devices is denoted in the representation, for example by at least one indicator having at least one status, as set forth in the foregoing (see, e.g., Table 1). Then, the wireless digital video camera as ICD is operable to send a still image to the DVR interface for the user to confirm identity of the ICD sending the image. The user may rename the ICD at that time or at a subsequent time. Importantly, no additional user steps are required to establish the monitoring set-up.

Camera Validation/Communication Optimization

The DVR is further operable to validate the device approval status for communication with the specific DVR and optimizes the wireless signal to the DVR to ensure the greatest information throughput.

Camera Locking/Security Establishment

Preferably, security functionality is operable when a DIR automatically locks a specific ICD, such as to permit sending wireless data only to that specific DIR and automatically initiating security on the data stream. The security methods may include cryptographic methods such as digital signing, stream cipher encryption, block cipher encryption, and public key encryption or hardware based encryption in which each device has a hardware device for encryption included. By way of example and not limitation, WAP, 802.11i, AES, SSL, stream cipher, Trojan, DES, any other type of security protocol, and combinations thereof may be used.

DIR Locking

Any of the DIRs operable within the system and having at least one ICD associated therewith are further operable to be locked to prevent setting changes or data manipulation from any device apart from the DIR with which each ICD is locked into communication. In one embodiment of the present invention having video cabilities, the DVR as DIR, upon confirming detection of all the signal(s) from ICD(s) associated therewith, confirms the establishment of communication with each detected ICD, in particular wireless digital video camera, and locks the DVR to only communicate with the found device(s), unless it receives instruction from the user to look for other signal(s). The DVR indicates such a locked status, for example, by displaying a lock indicator on the DVR and/or on the ICD to provide an external visual status indication that the ICD(s) are locked and also sends a lock status signal to an entity outside the present system, such as to the RSC and/or an alarm system or security software. Once searching and locking is complete, the DVR will not accept signals from capture devices that are not locked to the DVR, unless directed to search for capture devices by the user by click-selecting the search button. Alternatively, the system can notify the user of new ICDs that come into communication with the system during operation and/or after initial setup has occurred.

Camera Removal

ICDs may be removed from operation and/or operational communication or interaction with the system. To remove a capture device from the DVR system, the user click-selects from the user interface on an image and/or name that represents the capture device they want removed and then click-selects a single removal button or click select option on the user interface. The DIR then removes that capture device from the system.

DVR-based Querying

The present invention provides a method of providing digital image recorder (DIR)-based querying including the steps of: providing a system having polling capabilities and digital input security, the system having at least one wireless input capture device and at least one DIR; providing a computer system or network operable to permit a user to connect to the Internet for accessing at least one of the wireless input capture device(s) without requiring any additional steps to be performed by the user. In a preferred embodiment of the present invention, a method of providing digital input recorder (DIR) based querying includes the steps of:

providing a system for wireless surveillance of a target environment, the system including at least one wireless input capture device (ICD), at least one digital input recorder (DIR), which has polling capabilities, configured and operable for wireless communication with the ICDs, and a remote server computer (RSC) configured and operable for communication with the DIR for permitting the system to be accessed remotely via the Internet by an authorized user;

an authorized user connecting to Internet and logging into the system;

the DIR communicating with the RSC to transmit input data from the ICDs and/or to receive posted information or data from the RSC for its review upon polling;

alternatively, the DIR connects to Internet via a USB or direct network connection;

the DIR polls the RSC on predetermined intervals, such as every 1-60 seconds;

the user logs into RSC with an authorized username and password, the user selects a DIR either by searching or from a list, the user enters an instruction, command, or setting for the DIR, such as to display a specific ICD, e.g., by selecting from a list, or change capabilities of an ICD or the DIR;

the DIR polls the RSC on predetermined intervals for direction and responds as needed; in such a configuration, the RSC does not send instructions directly to the DIR, but posts for the DIR to access the directive or instruction, which the DIR receives during polling;

thereby removing restraints against inbound network traffic and changing IP addresses, as well as eliminating firewall limitations, since all network traffic is outbound from the DIR;

the user accessing at least one of the wireless input capture device(s) through the DIR after its polling and receipt of posted instruction; with no additional steps required to be performed by the user for remote accessing the inputs captured by the ICDs.

Certain modifications and improvements will occur to those skilled in the art upon a reading of the foregoing description. All modifications and improvements have been deleted herein for the sake of conciseness and readability but are properly within the scope of the claims.

What is claimed is:

1. A wireless surveillance system including:
    at least two input capture devices (ICDs);
    wherein each ICD is encased by a housing and includes at least one sensor, at least one input component for detecting and recording inputs of data acquired by the at least one sensor, a processor, a memory, a power source, a power converter; and a transmitter/receiver, all constructed and configured in electronic connection;
    wherein the ICD(s) are auto-configuring for the ICD configuration settings associated with surveillance operation, in direct cross-control of one another's surveillance settings, and directly cross-communicate data, including input data relating to the environment under surveillance, control settings and inputs including video;
    wherein each ICD is constructed and configured for releasably mounting to an electric track, thereby providing a quick installation of the ICD; and
    wherein the ICD(s) are constructed and configured to operationally create a network of ICD(s) that directly exchange video information relating to the target environment under surveillance by the at least two ICDs and for providing an extended range of surveillance.

2. The system of claim 1, wherein the ICD is newly or retrofittably releasably mountable to the track.

3. The system of claim 1, wherein the ICD is functional and operable to capture input from the sensors, while mounted to the track.

4. The system of claim 1, further including an adjustable mounting device connected to the housing of the ICD for adjusting the angle and direction of the ICD to optimize data input by the sensors.

5. The system of claim 4, wherein the adjustable mounting device functions to pivot the ICD relative to a first position when mounted to the track.

6. The system of claim 4, wherein the adjustable mounting device functions to rotate the ICD relative to a first position when mounted to the track.

7. The system of claim 4, wherein the adjustable mounting device is a universal joint that includes functions of pivoting and rotating relative to a first position when mounted to the track.

8. The system of claim 1, wherein the data input from the sensors is selected from visual images, sound, odor, temperature, the presence of chemicals or radiation, the presence or absence of movement, and combinations thereof.

* * * * *